United States Patent
Woo et al.

(10) Patent No.: US 7,550,949 B2
(45) Date of Patent: Jun. 23, 2009

(54) PROCESS FOR CONTROLLING TEMPERATURE OF BATTERY PACK

(75) Inventors: Hyosang Woo, Daejeon (KR); Jaesung Ahn, Busan (KR); JongMin Park, Daejeon (KR); Do Yang Jung, Hwaseong-si (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 217 days.

(21) Appl. No.: 11/265,375

(22) Filed: Nov. 2, 2005

(65) Prior Publication Data

US 2006/0214640 A1   Sep. 28, 2006

(30) Foreign Application Priority Data

Nov. 2, 2004   (KR) .................. 10-2004-0088522

(51) Int. Cl.
*H02J 7/04* (2006.01)
*H02J 7/16* (2006.01)
*H01M 2/10* (2006.01)

(52) U.S. Cl. ........................................ 320/150; 429/98
(58) Field of Classification Search .................. 320/150; 428/98
See application file for complete search history.

(56) References Cited

U.S. PATENT DOCUMENTS 5,982,152 A * 11/1999 Watanabe et al. ............ 320/150
2004/0135550 A1* 7/2004 Nishihata et al. ............ 320/150

FOREIGN PATENT DOCUMENTS

JP   2000012107   1/2000
JP   2000036327   2/2000

OTHER PUBLICATIONS

KR20050007648; Jan. 21, 2005; Hwan; "Tray of Cell Pack for Hybrid Electric Automobiles,Improving Life Span of Cell Pack"; Abstract Only; 1 page.
International Search Report; International Application No. PCT/KR2005/003362; Date of the actual completion of the international search: Feb. 28, 2006; Date of Mailing: Feb. 28, 2006; 2 pages.

* cited by examiner

*Primary Examiner*—Edward Tso
*Assistant Examiner*—Alexis Boateng
(74) *Attorney, Agent, or Firm*—Cantor Colburn LLP

(57) ABSTRACT

A process for controlling temperature of a battery pack includes operating a fan to change a battery temperature to an optimal range of temperature ($T_{opt}$) when a condition is satisfied that the battery temperature is equal to or greater than a maximum acceptable temperature ($T_{max}$) or when the battery temperature is equal to or less than a minimum acceptable temperature ($T_{min}$) and, at the same time, when the difference between a battery temperature ($T_{bat}$) and an air temperature ($T_{air}$) of air is equal to or greater than a critical temperature ($T_{crt}$), and operating the fan to change the battery temperature to an optimal range of temperature variation ($T_{opt1}$) of each unit cell when the battery temperature does not satisfy the condition, and a temperature variation ($T_{var}$) of each unit cell is equal to or greater than a predetermined critical temperature ($T_{crt1}$). According to the present invention, the operation of the fan is minimized, and therefore, optimal battery operation is accomplished while unnecessary power consumption is reduced. Furthermore, the temperature deviation between the unit cells is reduced, and therefore, the operation of the overall battery system is optimized.

8 Claims, 1 Drawing Sheet

PROCESS FOR CONTROLLING TEMPERATURE OF BATTERY PACK

FIELD OF THE INVENTION

The present invention relates to a process for controlling the temperature of a battery pack, and, more particularly, to a process for controlling the temperature of a battery pack that is capable of controlling the operation of a fan in simultaneous consideration of critical values of the maximum acceptable temperature and the minimum acceptable temperature of the battery pack for operation of the fan and a critical value of the difference between the temperature of the battery pack and the temperature of introduced air, when the fan is operated to control the temperature of the battery pack in the case that the battery pack is excessively heated or cooled, and preferably, is also capable of setting a condition for minimizing the temperature variation between unit cells constituting the battery pack to minimally operate the fan, thereby accomplishing an optimal temperature control effect and an optimal battery operation state.

BACKGROUND OF THE INVENTION

One of serious problems concerning vehicles using fossil fuel, such as gasoline or diesel oil, is release of air pollution. In order to solve this problem, technologies to use a secondary battery, which is rechargeable, as a power source for vehicles have been proposed. Electric vehicles (EV), which are powered only by batteries, and hybrid electric vehicles (HEV), which use batteries and existing engines jointly, have been developed, and some of the electric and hybrid electric vehicles are now in commercial use. Nickel metal hydride batteries are mainly used as the secondary battery, which is the power source for the electric vehicles (EV), and the hybrid electric vehicles (HEV). Recently, the use of lithium-ion batteries as the secondary battery has been studied.

The secondary battery must have high output and large capacity in order for the secondary battery to be used as the power source for the electric vehicles (EV), and the hybrid electric vehicles (HEV). To this end, a plurality of small secondary batteries (unit cells) are connected in serial or parallel with each other to form a battery group, and a plurality of battery groups are connected in serial or parallel with each other to form a battery pack.

However, the high-output, large-capacity battery has a problem in that a large amount of heat is generated in the course of charge and discharge. If heat generated from the unit cells in the course of charge and discharge is not efficiently removed, heat is accumulated, and thereby, the unit cells are deteriorated.

When the temperature of the battery pack is excessively lowered, many reaction-retarding elements affect the electrochemical reaction in the unit cells, and therefore, the performance of the battery is remarkably lowered.

Consequently, temperature control for efficient operation of the unit cells is required for the battery pack, which is a high-output, large-capacity battery.

According to a conventional process for controlling the temperature of the battery pack, an efficient range of temperature $T_{mg}$ of the battery, a maximum acceptable temperature $T_{max}$ of the battery, and a minimum acceptable temperature $T_{min}$ of the battery are preset. When the temperature of the battery pack is equal to or greater than the maximum acceptable temperature $T_{max}$, a cooling fan is operated, and, when the temperature of the battery pack is equal to or less than the minimum acceptable temperature $T_{min}$, a heater of an air conditioning system is operated, to maintain the temperature of the battery pack at the efficient range of temperature $T_{mg}$. In some of the conventional arts, the temperature section between the efficient range of temperature $T_{mg}$ and the maximum acceptable temperature $T_{max}$ and the temperature section between the efficient range of temperature $T_{mg}$ and the minimum acceptable temperature $T_{min}$ are subdivided to control the driving rate of the fan.

However, the conventional process for controlling the temperature of the battery pack has the following problems.

First, only change in temperature of the battery pack is detected to operate the fan while the cooling or heating efficiency of air supplied by the operation of the fan is not considered. As a result, the efficiency of temperature control according to the operation of the fan is remarkably low. For example, when the temperature of air introduced by the operation of the fan is high, the cooling effect is low although the driving rate of the fan is high.

Secondly, the deterioration of battery efficiency due to the temperature difference in the unit cells constituting the battery pack is not controlled. Although one of the principal causes lowering the operation efficiency of the battery system is the great temperature variation between the unit cells, this temperature variation is not considered in the conventional process for controlling the temperature of the battery pack.

SUMMARY OF THE INVENTION

Accordingly, the present invention is directed to a process for controlling the temperature of a battery pack that substantially obviates the above-mentioned problems of the conventional arts as well as the technical problems requested from the past.

The inventors have performed various experiments and research, and have found that the temperature control by the operation of the fan is effectively accomplished when the difference between the temperature of air supplied by the fan operated on the temperature control system of the battery pack and the temperature of the unit cells is equal to or greater than a predetermined level, and the optimal operation condition of the battery is achieved when the temperature variation of the unit cells are simultaneously controlled by the temperature control system. As a result, the inventors have completed the present invention.

Consequently, it is a first object of the present invention to provide a process for controlling the temperature of a battery pack that is capable of accomplishing the optimal temperature control by the minimum operation of the fan.

It is a second object of the present invention to provide a process for controlling the temperature of a battery pack that is capable of accomplishing the optimal operation of the battery system by simultaneous control of temperature variation of each of the unit cells.

In accordance with the present invention, the above and other objects can be accomplished by the provision of a process for controlling temperature of a battery pack, comprising the step of: operating a fan to change a battery temperature to an optimal range of temperature $T_{opt}$ when a condition is satisfied that the battery temperature is equal to or greater than a maximum acceptable temperature $T_{max}$ or when the battery temperature is equal to or less than a minimum acceptable temperature $T_{min}$ and, at the same time, when the difference between a battery temperature $T_{bat}$ and an air temperature $T_{air}$ of air is equal to or greater than a critical temperature $T_{crt}$.

One of the characteristics of the present invention is that, when the fan of the air conditioning system is operated, and the air, which serves as a heat exchange medium, is supplied to the battery to control the temperature of the battery, it is decided whether the fan is to be operated or not in consideration of the the difference between a battery temperature $T_{bat}$ and an air temperature $T_{air}$ ($T_{bat}$-$T_{air}$) as well as maximum acceptable temperature $T_{max}$ and the minimum acceptable temperature $T_{min}$. The temperature control efficiency according to the operation of the fan is not high when the difference between a battery temperature $T_{bat}$ and an air temperature $T_{air}$ ($T_{bat}$-$T_{air}$) is equal to or less than the critical temperature $T_{crt}$ although the battery temperature is equal to or greater than the maximum acceptable temperature $T_{max}$, and therefore, cooling is required, or the battery temperature is equal to or less than the minimum acceptable temperature $T_{min}$, and therefore, heating is required. According to the present invention, the fan is operated only when the difference between a battery temperature $T_{bat}$ and an air temperature $T_{air}$ ($T_{bat}$-$T_{air}$) is equal to or greater than the critical temperature $T_{crt}$ although the cooling or the heating is required. Consequently, power consumption due to excessive operation of the fan is reduced, and reduction of the service life of the product is prevented.

According to the present invention, it is preferable that the battery, the temperature of which is measured, is a battery pack, battery groups constituting the battery pack, or unit cells constituting the respective battery groups. When the battery is the battery groups or the unit cells, the temperatures of the battery groups or the unit cells are measured, and the measured maximum temperature and the measured minimum temperature may be set as the battery temperature $T_{bat}$, or the average of the measured temperatures may be set as the battery temperature $T_{bat}$.

The maximum acceptable temperature $T_{max}$ is a temperature at which the cooling of the battery is required by the operation of the fan. The maximum acceptable temperature $T_{max}$ may be changed depending upon kinds of battery. The minimum acceptable temperature $T_{min}$ is a temperature at which the heating of the battery is required by the operation of the fan. The maximum acceptable temperature $T_{max}$ may be also changed depending upon kinds of battery.

According to circumstances, it is preferable to subdivide the maximum acceptable temperature $T_{max}$ and the minimum acceptable temperature $T_{min}$, at which the fan is required to be operated, and change the driving rate of the fan according to the subdivided maximum acceptable temperature $T_{max}$ and the subdivided minimum acceptable temperature $T_{min}$. For example, a maximum acceptable temperature $T_{max1}$ may be preset for accomplishing 60% of the driving rate of the fan, another maximum acceptable temperature $T_{max2}$ for accomplishing 80% of the driving rate of the fan, another maximum acceptable temperature $T_{max3}$ for accomplishing 90% of the driving rate of the fan, and yet another maximum acceptable temperature $T_{max4}$ for accomplishing 100% of the driving rate of the fan. The temperatures of maximum acceptable temperature $T_{max1}$, $T_{max2}$, $T_{max3}$, and $T_{max4}$, are sequentially increased. Preferably, the maximum acceptable temperature $T_{max}$, at which the fan starts to be operated, is 20° C., and the minimum acceptable temperature $T_{min}$, at which the fan starts to be operated, is −10° C.

The air, which is a heat exchange medium introduced into the battery pack by the operation of the fan, may be air introduced from the outside of the system, air circulating in the system, or air supplied from a cooling unit or a heating unit, such as an engine. Preferably, the air is introduced from the outside of the system.

When the difference between the air temperature $T_{air}$ and the battery temperature $T_{bat}$ is equal to or greater than a predetermined level, the temperature control efficiency by the operation of the fan is accomplished. Consequently, the fan starts to be operated only when the difference between a battery temperature $T_{bat}$ and an air temperature $T_{air}$ ($T_{bat}$-$T_{air}$) is equal to or greater than the critical temperature $T_{crt}$. In a preferable example, the critical temperature $T_{crt}$ is 5° C.

According to circumstances, the air is introduced from the outside of the system, and the process for controlling temperature of the battery pack may further comprise the steps of: when the air temperature $T_{air}$ of the air is too high, mixing or replacing the air with air supplied from an additional cooling unit; and, when the air temperature $T_{air}$ of the air is too low, mixing or replacing the air with air supplied from an additional heating unit.

With the above-stated construction, the air temperature $T_{air}$ of the air, which is the heat exchange medium, is maintained at an appropriate level. The heating unit may be an engine or an additional heater.

The optimal range of temperature $T_{opt}$ may be also changed depending upon kinds of battery.

In a preferable example, the process for controlling temperature of the battery pack further comprises the step of: operating the fan to change the battery temperature to an optimal range of temperature variation $T_{opt1}$ of each unit cell when a temperature variation $T_{var}$ of each unit cell is equal to or greater than a predetermined critical temperature $T_{crt1}$ although the fan driving condition is not satisfied.

As described above, the efficiency of the battery system is remarkably lowered when the temperature variation of the respective unit cells constituting the battery pack is large. Consequently, the operation state of the battery is optimized by the process for controlling temperature of the battery pack according to the present invention.

The critical temperature $T_{crt1}$ of temperature variation $T_{var}$ and the optimal range of temperature variation $T_{opt1}$ may be changed depending upon kinds of battery. In a preferable example, the critical temperature $T_{crt1}$ is 4° C., and the optimal range of temperature variation $T_{opt1}$ is 2° C.

The battery pack is used as a power source for electric vehicles or hybrid electric vehicles, which require high-output, large-capacity power. Preferably, the battery pack is a power source for the hybrid electric vehicles.

According to circumstances, additional steps may be included to increase efficiency of the process for controlling the temperature of the battery pack according to the present invention, and it should be noted that the process for controlling the temperature of the battery pack including the additional steps falls into the scope of the present invention.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
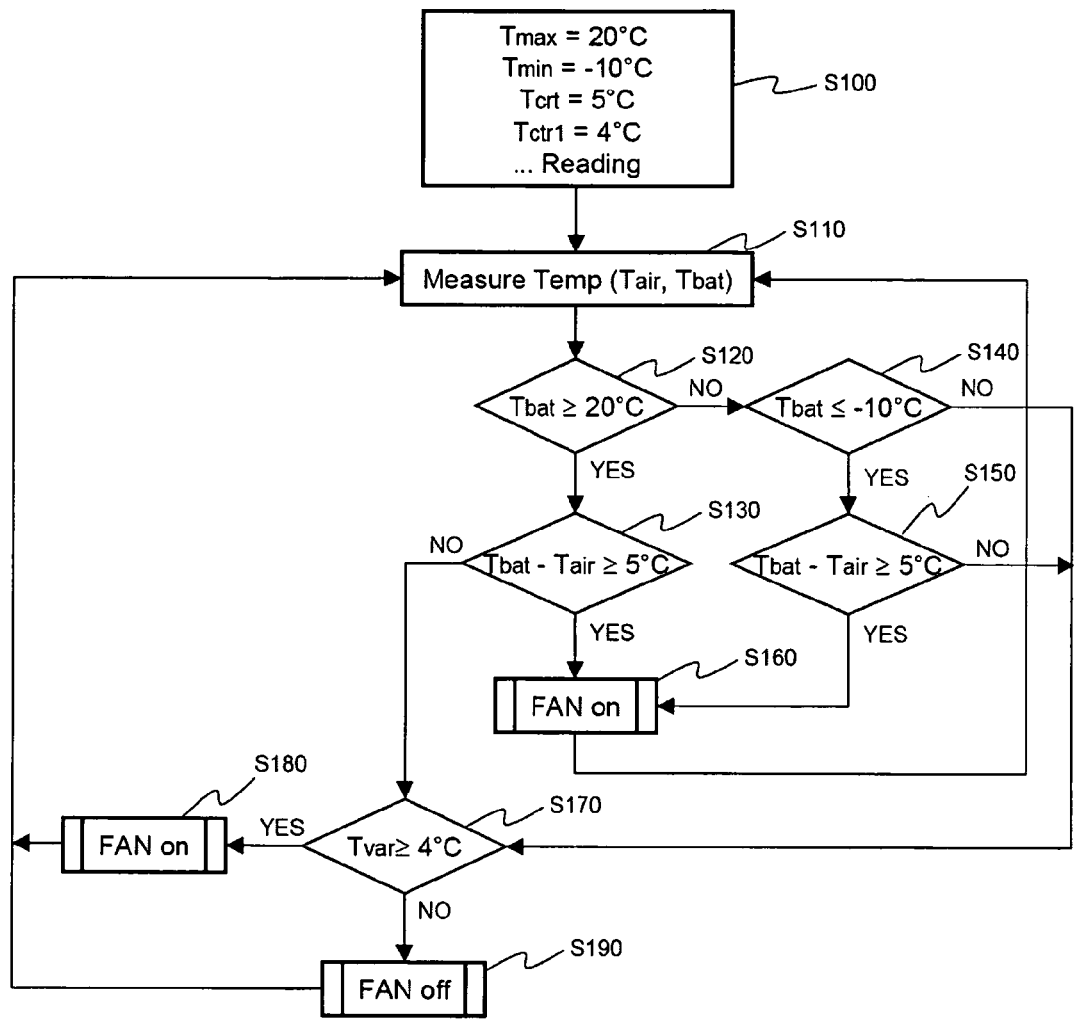
FIG. 1 is a flow chart illustrating a process for controlling the temperature of a battery pack according to a preferred embodiment of the present invention.

Now, a preferred embodiment of the present invention will be described in detail with reference to the accompanying drawings. It should be noted, however, that the illustrated embodiment is given merely to assist clear understanding of the present invention, and therefore, the scope of the present invention is not limited by the illustrated embodiment.

FIG. 1 is a flow chart illustrating a process for controlling the temperature of a battery pack according to a preferred embodiment of the present invention.

Referring to FIG. 1, when a system for controlling the temperature of the battery pack is operated, values of various parameters are read (S100), and a battery temperature $T_{bat}$ and an air temperature $T_{air}$ are measured (S110). The parameters are set as follows: a maximum acceptable temperature $T_{max}$ is set to 20° C., a minimum acceptable temperature $T_{min}$ to −10° C., a critical temperature $T_{crt}$ to 5° C., and another critical temperature $T_{crt1}$ to 4° C. The battery temperature That and the air temperature $T_{air}$ may be measured by temperature sensors.

It is determined whether the measured battery temperature $T_{bat}$ is equal to or greater than the preset maximum acceptable temperature $T_{max}$, i.e., 20° C. (S120). When it is determined that the measured battery temperature $T_{bat}$ is equal to or greater than 20° C. (YES), it is determined whether the absolute value of the difference between the battery temperature $T_{bat}$ and the air temperature $T_{air}$ ($T_{bat}$-$T_{air}$) is equal to or greater than the critical temperature $T_{crt}$, i.e., 5° C. (S130). When it is determined that the absolute value of the difference between the battery temperature $T_{bat}$ and the air temperature $T_{air}$ ($T_{bat}$-$T_{air}$) is equal to or greater than 5° C. (YES), a fan is operated (S160). When it is determined that the absolute value of the difference between the battery temperature $T_{bat}$ and the air temperature $T_{air}$ ($T_{bat}$-$T_{air}$) is less than 5° C. (NO), on the other hand, the procedure moves to Step S170, which will be described below.

When it is determined at Step S120 that the measured battery temperature $T_{bat}$ is less than 20° C. (NO), it is determined whether the measured battery temperature $T_{bat}$ is equal to or less than the minimum acceptable temperature $T_{min}$, i.e., −10° C. (S140). When it is determined that the measured battery temperature $T_{bat}$ is equal to or less than −10° C. (YES), it is determined whether the absolute value of the difference between the battery temperature $T_{bat}$ and the air temperature $T_{air}$ ($T_{bat}$-$T_{air}$) is equal to or greater than the critical temperature $T_{crt}$, i.e., 5° C. (S150). When it is determined that the absolute value of the difference between the battery temperature $T_{bat}$ and the air temperature $T_{air}$ ($T_{bat}$-$T_{air}$) is equal to or greater than 5° C. (YES), the fan is operated (S160).

When it is determined at Step S140 that the measured battery temperature $T_{bat}$ is greater than −10° C. (NO), or when it is determined at Step S150 that the absolute value of the difference between the battery temperature $T_{bat}$ and the air temperature $T_{air}$ ($T_{bat}$-$T_{air}$) is less than 5° C., the procedure moves to Step S170, which will be described below.

It is determined at Step S170 whether the temperature variation of the unit cells is equal to or greater than the critical temperature $T_{crt1}$, i.e., 4° C. When it is determined that the temperature variation of the unit cells is equal to or greater than 4° C. (YES), the fan is operated (S180). When the temperature variation of the unit cells is less than 4° C., and the fan is being operated, the operation of the fan is stopped (S190). When the temperature variation of the unit cells is less than 4° C., and the fan is not being operated, the procedure is returned to Step S110 without performing any other operations. Once the fan is operated (S160 and S180), the procedure is returned to Step S110.

The operation flow shown in FIG. 1 may be variously modified. For example, Step S130 may be carried out after Step S110 is carried out, or Steps S120 and S140 may be carried out after Step S150 is carried out. Alternatively, Step S120 may be carried out after Step S170 is carried out. Also, as previously described, maximum acceptable temperatures $T_{max1}$, $T_{max2}$, $T_{max3}$ . . . , the temperatures of which are sequentially increased, may be preset to control the driving rate of the fan, and several determination steps and a step of determining the driving rate of the fan may be carried out between Step S120 and Step S130. It is also possible that, after the fan is operated at Step S160 and Step S180, the temperature of the battery is measured to determine whether the measured temperature is within the optimal range of temperature for battery operation without directly returning to Step S110. In this case, when it is determined that the measured temperature is within the optimal range of temperature for battery operation, Step S190 is carried out to stop the operation of the fan, and then the procedure is returned to Step S110. When it is determined that the measured temperature is not within the optimal range of temperature for battery operation, on the other hand, the fan is continuously operated in a looped manner.

As described above, various constructions may be provided to embody the concept of the present invention, and these constructions are based on the concept of the present invention including determination as to whether the measured temperature of the battery exceeds the maximum or minimum acceptable temperature necessary for operating the fan and whether the battery temperature and the air temperature exceed the specific critical temperatures when the measured temperature of the battery exceeds the maximum or minimum acceptable temperature in order to decide the operation of the fan.

Consequently, those skilled in the art will appreciate that various modifications, additions and substitutions are possible, without departing from the scope and spirit of the invention as disclosed in the accompanying claims.

INDUSTRIAL APPLICABILITY

As apparent from the above description, the process for controlling the temperature of the battery pack has industrial applicability in that the operation of the fan is minimized, and therefore, optimal battery operation is accomplished while unnecessary power consumption is reduced and in that the temperature deviation between the unit cells is reduced, and therefore, the operation of the overall battery system is optimized.

What is claimed is:

1. A process for controlling temperature of a battery pack having unit cells, comprising the steps of:

operating a fan to change a battery temperature to an optimal range of temperature ($T_{opt}$) when a condition is satisfied that the battery temperature is equal to or greater than a maximum acceptable temperature ($T_{max}$) or when the battery temperature is equal to or less than a minimum acceptable temperature ($T_{min}$) and, at the same time, when the difference between a battery temperature ($T_{bat}$) and an air temperature ($T_{air}$) of air is equal to or greater than a critical temperature ($T_{crt}$);

operating the fan to change the battery temperature to a temperature within an optimal range of temperature variation ($T_{opt1}$) between each unit cell when the battery temperature does not satisfy the condition, and when a temperature variation ($T_{var}$) between each unit cell is equal to or greater than a predetermined critical temperature ($T_{crt1}$);

when the air temperature ($T_{air}$) of the air is too high, mixing or replacing the air with air supplied from an additional cooling unit; and when the air temperature ($T_{air}$) of the air is too low, mixing or replacing the air with air supplied from an additional heating unit.

2. The process as set forth in claim 1, wherein the battery, the temperature of which is measured, is a battery pack, battery groups constituting the battery pack, or unit cells constituting the respective battery groups.

3. The process as set forth in claim 1, further comprising the step of:

subdividing the maximum acceptable temperature ($T_{max}$) and the minimum acceptable temperature ($T_{min}$), at which the fan is required to be operated, and changing the driving rate of the fan according to the subdivided maximum acceptable temperature ($T_{max}$) and the subdivided minimum acceptable temperature ($T_{min}$).

4. The process as set forth in claim 1, wherein the maximum acceptable temperature ($T_{max}$), at which the fan starts to be operated, is 20° C., and the minimum acceptable temperature ($T_{min}$), at which the fan starts to be operated, is −10° C.

5. The process as set forth in claim 1, wherein the air, which is a heat exchange medium, is air introduced from the outside of a system, air circulating in the system, or air supplied from a cooling unit or a heating unit in the system.

6. The process as set forth in claim 1, wherein the critical temperature ($T_{crt}$) is 5° C.

7. The process as set forth in claim 1, wherein the critical temperature ($T_{crt1}$) is 4° C., and the optimal range of temperature variation ($T_{opt1}$) is 2° C.

8. The process as set forth in claim 1, wherein the battery is a power source for electric vehicles or hybrid electric vehicles.

* * * * *